UNITED STATES PATENT OFFICE.

CHARLES G. TUFTS, OF SYRACUSE, NEW YORK, ASSIGNOR TO SEMET-SOLVAY COMPANY, OF SOLVAY, NEW YORK, A CORPORATION OF PENNSYLVANIA.

ART OF TREATING COAL-GASES.

1,078,014.  Specification of Letters Patent.  Patented Nov. 11, 1913.

No Drawing.  Application filed April 19, 1912.  Serial No. 691,977.

*To all whom it may concern:*

Be it known that I, CHARLES G. TUFTS, a citizen of the United States, residing at Syracuse, in the county of Onondaga and State of New York, have invented certain new and useful Improvements in the Art of Treating Coal-Gases, of which the following is a specification.

As is well known, gas produced by the destructive distillation of coal contains various elements of value, such as tar, combustible gas which may be utilized for illuminating or heating purposes, and ammonia, both free and in the form of fixed compounds, as well as other substances which may be classed as impurities. The utilization of the elements of value requires their separation from one another as well as from the accompanying impurities. One method proposed for accomplishing such separation involves the passage of the gas as it comes from the retort or oven, after separation of the tar therefrom, through sulfuric acid to convert the ammonia into ammonium sulfate, while the combustible elements of the gas pass on to be separately recovered. The carrying out of such a process, however, presents many practical difficulties owing to the danger of bringing down with the tar the fixed ammonia compounds, mainly chlorids which are carried in the gas in the form of dispersed salts, and which thereby become mixed with the tar and lost, entailing a waste of ammonia, which in gases from certain coals may amount to forty per cent. or more of the total ammonia content. If, on the other hand, these salts are allowed to pass on and be broken up in the formation of the ammonium sulfate, the freed chlorin produces rapid corrosion and destruction of the apparatus with prohibitory expense for repairs. In case also the gas is so cooled before the formation of the sulfate as to wholly or partly condense the water vapor normally carried by the gas, *i. e.* the water vapor derived from the water originally contained in the coal, free ammonia will be brought down in solution and must be recovered by distillation of the ammoniacal liquor thus produced. The naphthalene present in the gas has also been a source of much difficulty in the methods of treatment heretofore employed; its deposition causing clogging of the apparatus with consequent stopping of the operation and expense for its removal.

The object of my improvements is to obviate these difficulties and provide a simple, efficient and economical process for recovering the constituents of value in the gas without loss, and in a commercially pure state. To this end I treat the gas as it comes from the receiving main to first remove from it a portion of its tar content and the fixed ammonia compounds in such manner that the fixed ammonia compounds shall enter into solution without becoming mixed with the tar and thus lost, and without removing any appreciable amount of free ammonia. This I may accomplish by scrubbing the hot gas as it comes from the retorts with water or its equivalent, in such quantity as to form a solution of the fixed ammonia compounds, and at such a temperature as will reduce the temperature of the gas to a point low enough to effect the removal of a portion of the tar and to facilitate the efficient removal of the remainder thereof, but not sufficiently low to cause any appreciable absorption of the free ammonia. I find that at temperatures of from 60° C. to 70° C. this preliminary removal of the tar and the solution of the fixed ammonia compounds will be effected without causing the absorption of more than a negligibly small quantity of free ammonia, but I do not limit myself to the use of this exact range of temperatures since the absorption of an amount of free ammonia slightly greater than the absolute minimum will not seriously affect the economic success of the process, and the tar and fixed ammonia compounds may be removed with satisfactory completeness at a temperature slightly above the stated maximum.

The washing of the gas to remove the fixed ammonia compounds may be accomplished in various ways that will readily occur to those skilled in the art as by passing the gas in opposition to a shower of water which may be circulated repeatedly so that the resulting solution may be concentrated to any desired point and drawn off as desired. The same result may be accomplished by adding to the hot gas water vapor in such excess of the amount normally carried thereby that a portion of it sufficient to take up the fixed ammonia compounds may be removed by cooling without absorption of the free ammonia, and then cooling the gas so as to condense such portion of the contained water vapor. In either case under the temperature conditions indicated above, the fixed ammonia, not being a true gas, is dissolved and held in solution while the free ammonia passes on unabsorbed. The resulting solution may be distilled with lime and the free ammonia gas produced united with that originally present to form ammonium sulfate, or the liquor may be directly worked for the recovery of fixed ammonia salts as such.

Instead of washing the gas with water to form a solution of the fixed ammonia compounds to be subsequently treated, it may be washed in the first instance with an alkaline solution as of caustic soda, soda ash or other suitable alkali, whereby the fixed ammonia compounds will be broken up and their ammonia content added directly to the free ammonia originally present in the gas. By this preliminary washing and cooling a large proportion of the tar carried by the gas, involving the heavier tar constituents, is thrown down and the gas is brought into a condition in which the remaining, lighter, tar can be removed without further decrease of temperature, and, if required, e. g. in cases of a gas so poor in ammonia that but little heat is generated in the saturator, the temperature may even be somewhat raised without interfering with the removal of the tar. In any case I so proceed that the gas is brought through the acid bath at such a temperature that no condensation of water vapor takes place therein, and the desired reactions are readily and neatly effected.

Since tar cannot be efficiently removed from gas by washing it in water, except at temperatures so low as to cause solution of the free ammonia, I subject the gas, after washing, to dry treatment, i. e., without condensing any of the normally contained water vapor, to complete the removal of the tar. The temperature conditions to be observed are substantially as above stated, i. e., between 60° C. and 70° C., so as to avoid on the one hand the condensation of water vapor (with loss of free ammonia) and deposition of naphthalene, and on the other hand to most efficiently effect the removal of the tar. This final removal of the tar before the gas enters the acid bath may, subject to the above stated conditions, be effected in any usual or convenient manner as by passing the gas through tar or through chambers containing baffles and through perforated screens by impact with which practically the last particles of tar are removed. In case any slight trace of tar still remains, this is removed in the following acid bath and will not be sufficient to impair the commercial value of the ammonium sulfate produced therein.

The gas after being treated to be freed from tar is passed through a bath of sulfuric acid where combination of the ammonia constituent of the gas with the acid takes place, forming ammonium sulfate, and the combustible elements of the gas pass on to be subsequently treated and recovered. Up to the point where the combustible elements of the gas leave the acid bath, it is maintained at such a temperature that the naphthalene is not deposited. In order to remove the naphthalene from the gas I wash the gas, after it leaves the acid bath, in water, or other liquid in which naphthalene is insoluble or only slightly soluble, and of such low temperature as to cause precipitation of the naphthalene. Such considerable quantity of water should be employed that the deposited naphthalene will be in suspension in the water and will be washed out freely without lodgment. Water of the temperature of that of any usual source of supply, such as river or spring water, may be used for this purpose, though any lower temperature may be employed, the lower the temperature the more rapid being the precipitation of the naphthalene. I have found it possible in this manner to reduce the gas from a temperature of 70° C. to as low as 5° C., and to remove the naphthalene continuously in the form of minute crystals without any tendency whatever for these crystals to cohere and thus plug the apparatus.

The naphthalene after its precipitation may be readily removed from the water by decantation and used in any desired manner.

The residue of gas after the removal of the naphthalene may be treated in any well known way for further purification if desired and stored for use as required.

It will be understood that any well known suitable form of apparatus may be used for carrying my process into effect, and the exact temperatures used may be varied according to the desire of the operator having reference to the character of the gas to be treated, and I do not limit by invention in these respects.

What I do claim as new, and desire to secure by Letters Patent, is:

1. The process of treating coal gases to separate and recover their constituents of value, which consists in first removing the fixed ammonia salts in solution and the heavier tar constituents without absorption of the free ammonia, then freeing the gas from tar and converting the free ammonia into ammonium sulfate and subsequently removing the naphthalene in crystalline form.

2. The process of treating coal gases to separate and recover their constituents of value which consists in first washing the gas with water in such excess and at such temperature as to remove the fixed ammonia salts in solution with a portion of the tar without absorption of the free ammonia or decomposition of naphthalene, then completing the separation of the tar from the gas and converting the free ammonia into ammonium sulfate while maintaining a temperature above that at which naphthalene will deposit and subsequently removing the naphthalene from the gas in crystalline form.

3. The process of treating coal gases to separate and recover their constituents of value which consists in first removing the fixed ammonia salts in solution with a portion of the tar without absorption of the free ammonia, then completing the separation of the tar from the gas and converting the free ammonia into ammonium sulfate, meanwhile keeping the gas at such temperature as to prevent the deposition of naphthalene and subsequently removing the naphthalene from the gas by washing the gas with a cold liquid in which naphthalene is insoluble or only slightly soluble.

4. The process of treating coal gases to separate and recover their constituents of value which consists in first washing the gas with excess of water at a temperature of approximately from 60° C. to 70° C. so as to remove the fixed ammonia salts in solution with a portion of the tar without absorption of the free ammonia, then completing the separation of the tar from the gas and converting the free ammonia into ammonium sulfate without material change of temperature and subsequently removing the naphthalene from the gas by washing the gas with a cold liquid in which naphthalene is insoluble or only slightly soluble.

5. The process of treating coal gases to separate and recover their constituents of value which consists in removing the tar and ammonia from the gas at temperatures above that at which the naphthalene will solidify, and then cooling the gas in the presence of a liquid in which naphthalene is insoluble or only slightly soluble, whereby the naphthalene is washed out in crystalline form.

6. The process of treating coal gases to separate and recover their constituents of value which consists in removing the tar and ammonia from the gas at temperatures above that at which the naphthalene will solidify, and then cooling the gas in the presence of a liquid in which naphthalene is insoluble or only slightly soluble, whereby the naphthalene is deposited in the form of independent crystals.

7. The process of treating coal gases to separate and recover their constituents of value which consists in removing the tar and ammonia from the gas at temperatures above that at which the naphthalene will solidify, and then washing the gas with a liquid in which naphthalene is insoluble or only slightly soluble, and of such temperature as to cool the gas and crystallize the naphthalene.

8. The process of treating coal gases to separate and recover their constituents of value which consists in removing the tar and ammonia from the gas at temperatures above that at which the naphthalene will solidify, and then washing the gas with a liquid in which naphthalene is insoluble or only slightly soluble, and of such temperature as to cool the gas and cause the precipitation of the naphthalene in the form of independent crystals.

9. The process of treating coal gases to separate and recover their constituents of value, which consists in cooling the hot gas as it comes from the main, in the presence of an excess of water to a temperature of from 60° C. to 70° C., whereby a portion of the tar and the fixed ammonia salts are removed therefrom, then completing the removal of the tar and treating the gas with acid to convert the free ammonia into ammonium sulfate without material reduction of temperature, and finally removing the naphthalene from the gas.

10. The process of treating coal gases to separate and recover their constituents of value which consists in cooling the hot gas as it comes from the main, in the presence of an excess of water to a temperature of from 60° C. to 70° C., whereby a portion of the tar and the fixed ammonia salts are removed therefrom, then completing the removal of the tar and treating the gas with acid to convert the free ammonia into ammonium sulfate, and finally cooling the gas in the presence of a liquid in which naphthalene is insoluble or only slightly soluble, to remove the naphthalene.

In testimony whereof, I have hereunto subscribed my name, this 17th day of April A. D., 1912.

CHARLES G. TUFTS.

Witnesses:
FREDERICK W. FILLY,
H. DUANE BRUCE.